B. BRADFORD.
DETACHABLE RIM FOR PNEUMATIC TIRES.
APPLICATION FILED MAY 26, 1910.
1,143,031.
Patented June 15, 1915.
FIG. I.
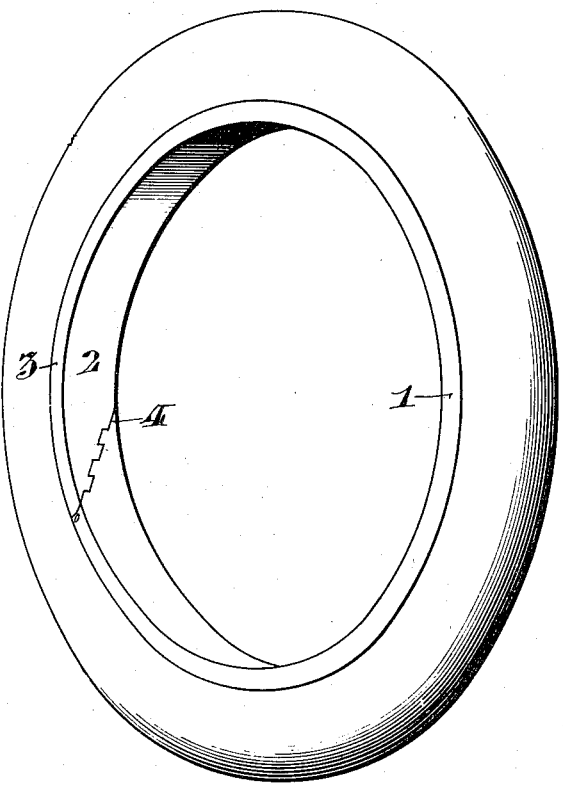
FIG. II.
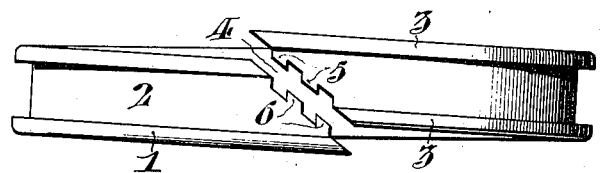
FIG. III.
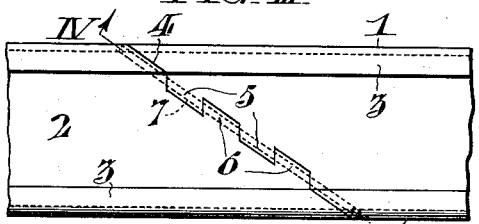
FIG. IV.
Witnesses
John C. Bergner
James H. Bell
Inventor
Benaiah Bradford,
By Haley & Paul
Attorneys.

UNITED STATES PATENT OFFICE.

BENAIAH BRADFORD, OF NORRISTOWN, PENNSYLVANIA, ASSIGNOR TO LEE TIRE & RUBBER CO., OF CONSHOHOCKEN, PENNSYLVANIA, A CORPORATION OF PENNSYLVANIA.

DETACHABLE RIM FOR PNEUMATIC TIRES.

1,143,031.      Specification of Letters Patent.     Patented June 15, 1915.

Application filed May 26, 1910. Serial No. 563,481.

*To all whom it may concern:*

Be it known that I, BENAIAH BRADFORD, residing at Norristown, in the county of Montgomery and State of Pennsylvania, have invented certain new and useful Improvements in Detachable Rims for Pneumatic Tires, whereof the following is a specification, reference being had to the accompanying drawings.

The invention relates to new and useful improvements in detachable rims for pneumatic tires and more especially to rims which are adapted to be connected to the tire before said rim is placed on the body of the wheel.

An object of the invention is to provide a detachable him which consists of substantially one integral structure which may be quickly attached to the clenching flanges of the tire and after the tire is inflated, readily attached to the rim proper of the wheel.

The invention consists in the parts and arrangements hereinafter described and set forth in the appended claims.

In the drawings, Figure I, is a perspective view showing a tire with my rim attached thereto. Fig. II, is an edge view of the rim detached from the tire and showing the split ends separated. Fig. III, is a similar view showing the split ends interlocked and secured together. Fig. IV, is a section on the line IV, IV, of Fig. III.

In carrying out my invention, I have provided a rim 1, which consists of an annular body portion 2, which is substantially flat in cross section, as clearly shown in Fig. IV. Said annular body portion is provided with integrally formed flanges 3, 3, which are adapted to receive the clenching flanges of the tire. The tire may of course, be of any desired construction. The rim 1, is split diagonally of edges of the annular body portion, as shown at 4, in Figs. II and III. The line on which said rim is divided preferably cuts the longitudinal axis of the rim at substantially thirty degrees, although it will be obvious that the inclination of said dividing line relative to the longitudinal axis may be slightly varied if desired.

One end of the split portion of the rim is provided with laterally projecting lugs 5, which are spaced to receive laterally projecting lugs 6, carried by the opposite split end of the rim. The lugs 5, and 6, are preferably disposed so as to project substantially at right angles to the longitudinal axis of the rim. When said lugs are interlocked, as clearly shown in Fig. III, the side faces of one lug will rest against the side faces of the next adjacent lug, and will lock said split portions against longitudinal movement. Each of the lugs 5, and 6, is perforated as shown in Fig. IV, and a locking pin 7, extending through said perforations holds said lugs in alinement and in interlocking relation one to the other.

In operation, the locking pin 7, is withdrawn from the perforated lugs and one of the split ends may be moved laterally relative to the other end and the clenching flanges of the tire properly inserted between the flanges 3, 3, of the rim. The laterally deflected end is the last part of the rim to be brought into engagement with the tire and when properly engaged with the flanges of the tire, the lugs 5, and 6, are interlocked, and the locking pin inserted through the perforations in said lugs, thus holding the same in interlocked position. The rim is now securely locked to the flanges of the tire, and the tire may be inflated. The rim with the tire attached thereto, may be readily secured to the rim proper of the wheel in any well known way, as by a series of wedges which engage between the detachable rim and the rim proper of the wheel. Any other suitable means may however be used.

It will thus be seen that I have provided a detachable rim which is composed of a single integral structure which may be readily constructed, easily attached to the tire, and that the tire with the attached rim may be quickly placed on the rim proper of the wheel.

Having thus described my invention, I claim:—

1. A detachable rim for pneumatic tires consisting of an integral annular flat portion having flanges for engaging and holding the tire, said portion and flanges being split obliquely whereby one end of the split portion may be moved laterally relative to the other, said ends having interlocking lugs thereon projecting laterally of the plane of the rim whereby said lugs may be engaged or disengaged by a lateral movement of the ends of the rim relative to each other, and means for securing said interlocking lugs in alinement.

2. A detachable rim for pneumatic tires, consisting of an integral annular body portion split substantially at an angle of 30 degrees with the side edges of the body portion, whereby one end of the split portion may be moved laterally relative to the other end, staggered interlocking lugs projecting from said split ends of the body portion, in a direction substantially at right angles thereto, said projecting lugs having perforations extending therethrough, and a locking pin adapted to engage said perforations and hold said lugs in alinement.

In testimony whereof, I have hereunto signed my name, at Philadelphia, Pennsylvania, this twelfth day of May, 1910.

BENAIAH BRADFORD.

Witnesses:
JAMES H. BELL,
E. L. FULLERTON.

Copies of this patent may be obtained for five cents each, by addressing the "Commissioner of Patents Washington, D. C."